Nov. 23, 1965 R. W. FLETCHER 3,219,839
SENSE AMPLIFIER, DIODE BRIDGE AND SWITCH MEANS PROVIDING
CLAMPED, NOISE-FREE, UNIPOLAR OUTPUT
Filed Feb. 15, 1962

INPUT SIGNAL

SWITCH 70

OUTPUT VOLTAGE

JUNCTION A

JUNCTION B

INVENTOR
ROYCE W. FLETCHER
BY Joseph C. Redmond, Jr.
ATTORNEY

United States Patent Office 3,219,839

Patented Nov. 23, 1965

3,219,839

SENSE AMPLIFIER, DIODE BRIDGE AND SWITCH MEANS PROVIDING CLAMPED, NOISE-FREE, UNIPOLAR OUTPUT

Royce W. Fletcher, Wappingers Falls, N.Y., assignor to International Business Machines Corporation, New York, N.Y., a corporation of New York Filed Feb. 15, 1962, Ser. No. 173,418

10 Claims. (Cl. 307—88.5)

This invention relates to amplifiers and, more particularly, to gated amplifiers employed in conjunction with information handling apparatus.

One form of a gated amplifier is a sense amplifier employed in computers and like apparatus at prescribed intervals to receive and amplify data stored in an information storage means, typically a core memory. One problem experienced in sense amplifier operation relates to noise signals occurring in the memory. The noise signals emanate from two principal sources, one source being the cores when switching occurs and the other source being the transition of the inhibit drivers. The signals developed by these sources are coupled into the input of the sense amplifier and alter its operation. The noise signals are relatively large in magnitude so that signal translating elements employed in the sense amplifier will saturate. The amplifier is gated off during this interval so that normally no output signal appears therefrom. In some cases, however, the noise signals will be sufficiently large so that the amplifier will be operated to provide a spurious output signal. Such a signal introduces erroneous data into the information being processed by the computer or like apparatus. Additionally, another problem develops when the amplifier is gated on to receive input signals indicative of valid data. The noise signals will have caused the signal translating elements to saturate so that the response of the amplifier to the input signal is delayed. As a result, memory operation must be delayed until the sense amplifier is in condition to accept an input signal. It is desirable, therefore, to improve the performance of sense amplifiers so that they will respond without delay to input signals, operate reliably, and be economical in cost.

A general object of the invention is an improved gated amplifier especially adapted for information storage means and the like.

One object is a sense amplifier which rapidly and reliably detects information signals.

Another object is a sense amplifier adapted to be insensitive to noise signals.

Another object is a sense amplifier that provides a unipolar output signal regardless of the input signal polarity.

Still another object is a sense amplifier that has a quiescent output level independent of the characteristics of signal translating elements employed therein.

These and other objects are accomplished in the present invention, one illustrative embodiment of which comprises a set of signal translating elements adapted to receive input signals and provide output signals of opposite polarity to a signal control circuit. The control circuit includes means for clamping the output circuits through suitable impedance means to a first reference voltage. Also, energy storage means are connected between the output circuits and the reference voltage to provide the necessary bias current for the signal translating elements and to maintain the voltage appearing across the output circuits at a relatively constant value. Additionally, a rectifier is included in each output circuit to pass current in a preselected direction. The rectifying means are connected together in series opposed relation, and the output signal appears across a load resistor connected to the common junction. Switching means are employed to connect and disconnect the reference voltage to the common junction. When the switch is in one condition, the output circuit is clamped to the reference voltage regardless of the magnitude of the input signal. The clamping circuits prevent saturation of the signal translating elements. Thus, when the switch is in a second condition, the signal translating elements will respond without delay to the input signal. One rectifier or the other is adapted to pass current of the same polarity from the signal translating elements according to the input signal applied to the elements. The absence of an input signal will not produce current flow in the circuit beyond the normal bias current. Thus, the present invention is not affected by noise signals, operates without delay in response to input signals and has relatively low power consumption.

One feature is a signal amplifying means connected to a control circuit which includes a switching device, a source of reference potential and means for retaining the amplifiers out of saturation, the switching device in one condition clamping an output circuit to the reference voltage and in the other condition permitting an amplified signal to appear in the output circuit.

Another feature is a control circuit arranged in a bridge configuration and adapted to receive input signals at diametrically opposite ends, said control circuit including means for retaining the voltage at the input ends at a constant level regardless of the magnitude of the signal applied to the ends.

Another feature is a signal amplifying source in combination with a bridge circuit including a switching means, a reference voltage and an energy storage means, the combination being adapted to clamp an output circuit to the reference voltage for one condition of the switch such that the signal amplifying device does not become saturated for nearly any input pulse and for the other condition of the switch, the combination being adapted to prevent current flow in the output circuit until an input signal is supplied to the signal amplifying source.

Still another feature of the invention is a pair of transistors of like conductivity having a common connection between emitter electrodes and means for applying an input signal to the base electrodes so that the transistors are slightly conducting, said transistors having their collector electrodes connected at diametrically opposite ends to a bridge circuit which includes switching means adapted to clamp the output circuits to a reference voltage in one condition of the switch and to permit current of one polarity only to appear in the output circuit in a second condition of the switch.

The foregoing and other objects, features and advantages of the invention will be apparent from the following more particular description of a preferred embodiment of the invention, as illustrated in the accompanying drawing.

Figure 1:
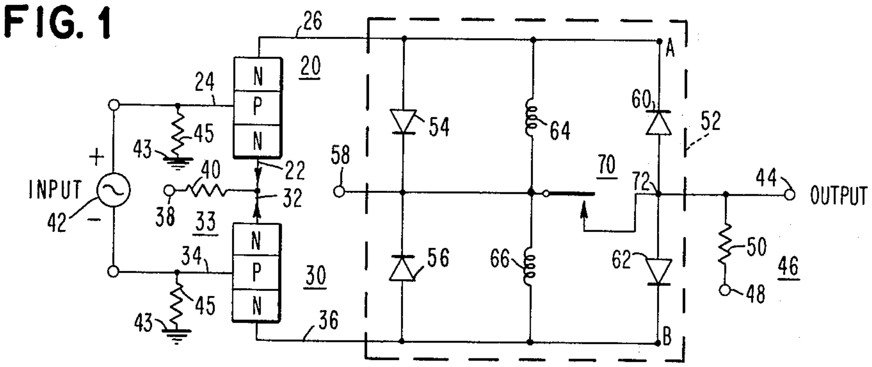
FIGURE 1 is an electrical schematic of one embodiment of the present invention.

Referring to FIGURE 1 one embodiment of the invention has first and second transistors 20 and 30 of like conductivity, the former including emitter electrode 22, base electrode 24 and collector electrode 26, and the latter including emitter electrode 32, base electrode 34 and collector electrode 36. An NPN type transistor has been selected for reasons of convenience in explanation, but a PNP type transistor may also be employed in the present invention. The latter type, however, will require changes in the polarity of the power supplies as well as other circuit modifications which are well known to a worker skilled in the art.

Emitter electrodes 22 and 32 are coupled together and thereafter to a current source 33, including a voltage supply 38 in series with a resistor 40. A signal generating source 42 is coupled to the base electrodes 24 and 34. The signal generating source provides difference signals to the base electrodes. Each base electrode is biased from a reference source 43, typically ground, through a resistor 45. The collector electrodes 26 and 36 are connected by way of a signal control circuit 52 to a utilization circuit 44 and a current supply 46 which includes a voltage source 48 and a load resistor 50. The signal control circuit will be described in more detail hereinafter. The transistors 20 and 30 function as a differential amplifier and represent one form of signal amplifying means that may be employed in the present invention. Other types of signal amplifiers, as is well known to a worker skilled in the art, may be employed without altering the operation or performance of the present invention. Accordingly, the invention should not be considered as being limited to a differential amplifier in combination with the control circuit. The differential amplifier, however, has been selected as a preferred embodiment in the present invention because of wide application in information storage means.

The signal control circuit includes a first set of asymmetrical devices 54 and 56 connected at corresponding ends to the collector electrodes 26 and 36, respectively, and at the remaining ends to a reference voltage 58, the polarity of the voltage 58 being selected to supply current through an impedance element (described hereinafter) to the transistors 20 and 30. The asymmetrical devices 54 and 56 function as clamping means to prevent the collector voltages from falling below the reference voltage 58 as is well known in the art. Connected in parallel with the devices 54 and 56 to form a bridge circuit is a second set of asymmetrical devices 60 and 62 in series opposed relation. The devices 54 and 60 of the first and second set of devices, respectively, are coupled to the collector electrode 26 to form a first junction designated A, the devices being arranged to have opposite electrodes connected to the junction. The devices 56 and 62 of the first and second set of devices, respectively, are coupled to the collector electrode 36 to form a second junction designated B, the devices 56 and 62 also being arranged to have opposite electrodes connected to the B junction. A pair of energy storage means 64 and 66 is connected in series and between the junctions A and B. The common junction between the storage means 64 and 66 is connected to the source so that the energy devices serve as the impedance means for supplying current to the transistor. Also, the connection places the energy storage device 64 in parallel with the diode 54 and the energy storage device 66 in parallel with the diode 56. Completing the signal control circuit 52 is a switching device 70, typically a transistor circuit, responsive to an input signal to connect the supply voltage 58 to common junction 72 between the diodes 60 and 62. The common junction 72 is also connected to the utilization circuit 44 and to the current source 46. The magnitude of the voltage source 48 is selected to be larger than the voltage supply 58 for reasons more apparent hereinafter.

The control circuit 52 is adapted to maintain the transistors 20 and 30 out of saturation for one condition of the switch 70 regardless of the magnitude of the signal source 42. Additionally, the control circuit renders the quiescent voltage of the utilization circuit 44 independent of any input signals supplied by the source 42. Thus, the transistors 20 and 30 need not be matched to realize this condition as is often the case in prior art circuit. In the other condition of the switch, the control circuit permits a unipolar output signal to be supplied to the utilization circuit without any shift in output voltage level. Also, no current is supplied to the utilization circuit 44 unless an input signal is supplied by the source 42. When an input signal is supplied, the maximum voltage amplification of the transistors is developed since the impedance of the energy storage means of 64 and 66 for high frequency input signals will be sufficiently large so that substantially all of the output signal will appear across the load resistor 50. These and other advantages of the circuit will appear in connection with the operation of the circuit which will be described in the remaining paragraphs of the description.

Normally, the transistors are biased from reference source connected to the base electrodes and are adapted to be slightly conducting. The devices 54 and 56 are normally reverse biased so that current flows from the source 58 through the impedances 64 and 66 to the transistors 20 and 30, the emitters of which are connected to the supply 38 through the resistor 40. The circuit elements are assumed to be ideal and symmetrical so that voltage changes can be determined with respect to ground as a reference. Input signals to the transistors 20 and 30 appear as a difference so that when conduction is increased in one transistor, the other transistor will be conducting at a reduced level or not at all. The switch 70 is normally closed resulting in the output voltage to the utilization circuit 44 being clamped to the supply voltage 58. The devices 54, 60 or 56, 62 collectively form bipolar clamps which limit the collector voltage of the transistors regardless of the polarity of the input signal. For example, if the transistor 20 conducts heavily, the collector potential decreases which turns on the device 60 and maintains the output voltage at the level of the source 58. Likewise, when the transistor 20 is turned off, the collector potential rises which turns on the device 54 and retains the output voltage at the level of the supply 58. The transistor 30 and devices 56 and 62 operate in a corresponding manner. It will be apparent, therefore, that the limited voltage change appearing at the collectors of the transistors maintains a substantially constant current through the impedance 64 or 66. Any additional current required beyond the bias current flowing through the impedance 64 or 66 is supplied through the device 60 or 62, depending upon the transistor that is conducting.

Figure 2A:
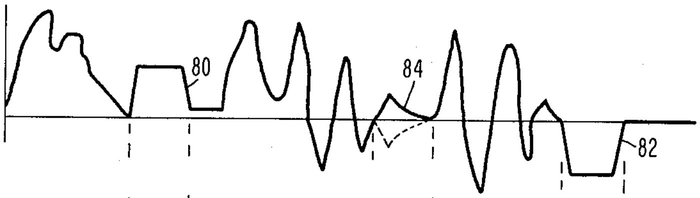
FIGURE 2A is a voltage-time graph of an input signal applied to the embodiment shown in FIGURE 1.

FIGURE 2A indicates the input signal appearing at the transistors 20 and 30. The input signal is widely varying due to the noise originating in the memory as previously explained. Periodically, valid information signals appear which may be in the form of a positive or negative pulse or the absence of a pulse. The positive and negative signals indicate a binary "1" information state and the absence of a signal indicates a binary "0" information state. A positive signal 80 and a negative signal 82 are indicated as being applied to the transistor 20. The reference level for these signals is that appearing at base electrode 34 for the transistor 30. Thus, it will be apparent that the positive signal 80 increases the current in the transistor 20 and corresponds to a negative pulse that reduces the current in the transistor 30. Similarly, the negative pulse 82 reduces the current in the transistor 20 and corresponds to a positive pulse that increases the current in the transistor 30.

Figure 2B:
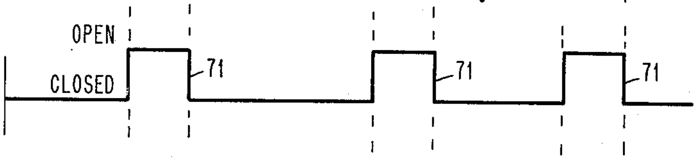
FIGURE 2B is a state-time graph of a switching device included in the embodiment shown in FIGURE 1.
Figure 2C:
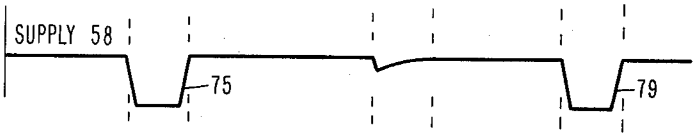
FIGURE 2C is a voltage-time graph of output signals provided by the embodiment shown in FIGURE 1.
Figure 2D:
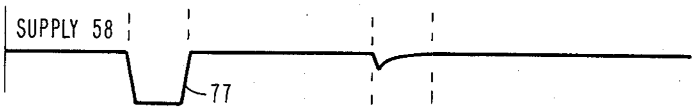
FIGURE 2D is a voltage-time graph of one signal developed in a signal control circuit included in the embodiment shown in FIGURE 1.

FIGURE 2B indicates the operation of the switch 70. Normally, the switch is closed but periodically as indicated by step pulse 71, the switch is opened, according to the read cycle of the information storage means. During the interval the switch is closed, the output voltage of the circuit, as indicated in FIGURE 2C, is clamped to the supply voltage of the source 58 due to the bipolar clamping action of the device sets 54, 60 and 56 and 62. The collector voltage appearing at the junctions A and B is also clamped to the supply voltage 58 as indicated in FIGURES 2D and E.

When the switch 70 is opened, the bipolar clamping action of the device sets 54, 60 and 56, 62 is terminated so that an output signal can be supplied the utilization circuit 44. A positive pulse 80, occurring during this interval, increases the conduction through the transistor 20 and decreases conduction through the transistor 30. As a result, the collector voltage of the transistor falls toward the level of the supply 43. The device 60 becomes forward biased and current flows from the source 48 through the diode 60 to the transistor 20 and thence to the current source 33. The device 54 is reverse biased due to the reduced collector voltage and the energy storage means 64 appears as a very large impedance at the frequencies associated with the input signal. As a result, substantially all the amplified input signal appears across the load resistor 50 in inverted form as pulse 75 indicated in FIGURE 2C. The amplified input signal corresponding to pulse 75 appears at the junction A as pulse 77 indicated in FIGURE 2D. The voltage at the junction B, however, remains substantially constant since the transistor 30 is reduced in conduction. The collector voltage, as a result, increases which turns on the device 56 so that the collector voltage is clamped to the supply 58. On release of the switch 70 the bipolar clamping action of the diode sets is restored and the output voltage is returned to the level of the supply 58.

The next operation of the switch 70 terminates the bipolar clamping action and places the circuit in condition to receive valid data. A signal 84 indicative of a binary "0" input does not change the conduction through either transistor so that the voltage supplied to the utilization circuit 44 is that appearing at the supply 48 less the drop occurring across the load resistor 50. The supply 48 and the resistor 50 are selected to provide a voltage level to the utilization circuit the same as that supplied by the source 58. Thus, no voltage translation of the output signal occurs in the circuit. Further, no additional current flows in the control circuit during this interval so that the power consumption is maintained at the minimum level consistent with the magnitude of the input signal. Thereafter, closing of the switch 70 restores the bipolar clamping action and maintains the voltage level at utilization circuit the same as that appearing at the supply 58.

Figure 2E:
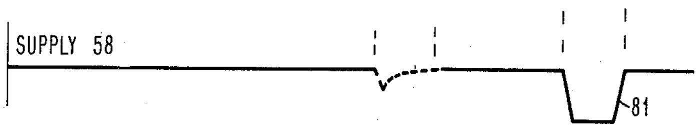
FIGURE 2E is a voltage-time graph of another signal developed in the signal control circuit included in the embodiment shown in FIGURE 1.

A negative signal 82 appearing at the transistor 20 results in the transistor 30 conducting heavily and the transistor 20 conducting slightly. The device 62 is turned on when the transistor 30 conducts so that an input signal will appear across the load resistor 50 in inverted form as pulse 79 indicated in FIGURE 2C. The device 62 is reverse biased and the energy storage means 66 presents a high impedance to the input signal resulting in amplified signal 81 indicated in FIGURE 2E being nearly identical to that of the input signal. The transistor 20 is clamped at its collector electrode to the supply 58 so that a substantially constant voltage is applied to the diodes 54 and 60 as indicated in FIGURE 2D. Bipolar clamping action is restored when the switch 70 is opened.

In summary, FIGURES 2A through 2E indicate that while the switch 70 is open, a positive or negative input signal will appear as a unipolar output pulse since either transistor 20 or 30 will conduct in response to the input signal and invert the input signal. Additionally, the symmetry of the circuit is such that current from the source 48 changes only when a valid binary "1" data input signal is received. Thus, the circuit has reduced power requirements which is desirable in computer systems where a multitude of such circuits are required. Also, there is no voltage translation of an input signal since the output voltage level is the same before and after an input signal is received. While the switch is closed, however, all input signals are isolated from the output circuit due to the bipolar clamping action of the device sets 54, 60 and 56, 62. The circuit has a rapid response to input signals due to the devices 54 and 56 which retain the transistors out of saturation. The quiescent output voltage is developed from the source 58 or 40 so that the circuit is independent of the transistor operating voltages. Accordingly, the transistors need not be matched in operating characteristics to obtain desirable circuit performance. It is believed, therefore, that these features and advantages of the circuit improve the performance of sense amplifiers so that they will respond quickly to input signals, operate reliably and be economical in cost due to the few number of active and passive elements required for the circuit.

While the invention has been particularly shown and described with reference to a preferred embodiment thereof, it will be understood by those skilled in the art that various changes in form and details may be made therein without departing from the spirit and scope of the invention.

I claim:

1. A gated amplifier comprising
   - signal amplifier means connected to receive input signals and provide a differential output signal,
   - means including a reference voltage and energy storage connected to the signal amplifier, means for biasing the signal amplifier means to be slightly conducting,
   - a bridge circuit connected across the signal amplifier means to receive the differential signal at diametrically opposite ends of the bridge,
   - an output circuit,
   - and switching means in one condition connecting the bridge circuit to the output circuit so that the reference voltage will be clamped to the output circuit regardless of the input signal magnitude and in the other condition connecting the bridge circuit to the output circuit so that output signals of only one polarity appear therein, said output signals being maintained at the reference voltage by the energy storage means.

2. A gated amplifier comprising
   - a differential amplifier including a pair of transistors of like conductivity,
   - said differential amplifier connected to receive input signals and provide differential signals of opposite polarity,
   - a reference voltage, a load circuit connected to the differential amplifier,
   - energy storage means connected between the transistors and the reference voltage to supplement the load current for said transistors, when required,
   - an output circuit,
   - and a control circuit including a switching means connected between the differential amplifier and the load circuit so that in one condition of the switch the transistors are operated nonsaturated for nearly all input signal magnitudes and the load circuit is clamped to the reference voltage, and in the other condition of the switch the control circuit is connected to the differential amplifiers so that output signals of only one polarity appear in the output circuit, said output signals being of substantially the same shape and reference level as the input signals.

3. A gated amplifier comprising
   - a differential amplifier including a pair of transistors of like conductivity and connected to receive difference signals as an input so that when one transistor is conducting heavily the other transistor will be conducting slightly,
   - a reference voltage, a load circuit connected to the differential amplifier,
   - energy storage means connected between the reference voltage and the transistors to supplement the load current for the transistors, when required,
an output circuit,
and a control circuit including bipolar clamping means and a switching means which for one condition provides for bipolar clamping of each transistor to the reference voltage and in the next condition of the switch connects the output circuit so that no signal current flows in the output circuit unless a difference signal is received indicative of one binary information state.

4. A gated amplifier comprising
first and second transistors of like conductivity,
each transistor having base, emitter and collector electrodes,
a current source connected to both emitter electrodes,
means biasing the base electrodes of the transistors to be slightly conducting,
means generating a difference signal connected to the base electrodes,
means connecting the collector electrodes of both transistors to a control circuit,
said control circuit including first and second sets of asymmetrical conducting devices, a reference voltage, energy storage means and a switching device,
and an output circuit connected to said control circuit, one condition of the switching device connecting the first set of asymmetrical conducting devices to clamp the output circuit to the reference voltage and the next condition of the switch connecting the second set of asymmetrical conducting devices to pass signals of one polarity only from the transistors to the output circuit, the energy storage means being connected to the transistors to maintain a substantially constant bias current therethrough.

5. A gated amplifier comprising
first and second transistors of like conductivity,
each transistor having base, emitter and collector electrodes,
a current source connected to both emitter electrodes,
means biasing the base electrodes of the transistors,
means generating a difference signal connected to the base electrodes,
means connecting the collector electrodes of both transistors to a control circuit,
said control circuit including first and second sets of asymmetrical conducting devices, a reference voltage, energy storage means and a switching device, and
an output circuit, said control circuit for one switching device condition, connecting each set of asymmetrical devices to different collector electrodes of said transistors to provide bipolar clamping of the collectors to the reference voltage so that the transistors are kept from saturating the control circuit for the other condition of the switch connecting the asymmetrical devices of each set to pass signals of one polarity only from the transistors to the output circuit the energy storage means being connected between the transistor collectors to maintain a substantially constant bias current through the transistors.

6. A gated amplifier comprising
signal generating means,
a control circuit including a bridge array of asymmetrical conducting devices, energy storage means, a reference voltage, and switch means, said bridge array including first and second sets of terminals,
the energy storage means connected between the first set of terminals, the first set of terminals being further connected to the signal generating means,
the reference voltage and switch means connected to different terminals in the second set of terminals, and
a load circuit connected to the second set of terminals.

7. The gated amplifier in claim 5 wherein the second set of terminals is also connected to the energy storage means.

8. The gated amplifier defined in claim 6 wherein the asymmetrical devices comprise first and second sets, each asymmetrical device set is connected in series opposed relation to a different first terminal.

9. A gated amplifier comprising
signal amplifying means,
an output circuit,
switching means,
a reference potential, and
a bridge circuit,
said bridge circuit comprising first and second sets of asymmetrically conducting devices, each set connected in series aiding relation, the first and second sets connected together in series opposed relation at first and second terminal points, the first terminal point connected to the reference potential, the second terminal point connected to the output circuit,
the switching means, in one condition, connecting the bridge circuit between the signal amplifying means and the output circuit to provide an output clamped to the reference potential,
the switching means, in a second condition, connecting the bridge circuit between the signal amplifying means and the output circuit to provide a unipolar output.

10. A gated amplifier comprising
signal amplifying means,
a reference potential,
an output circuit,
switching means, and
a control circuit including energy storage means and first and second sets of asymmetrical devices,
the switching means, in one condition, connecting the sets of asymmetrical devices to prevent the signal amplifying means from saturating and clamping the output circuit to the reference potential,
the switching means, in a second condition, connecting the signal amplifying means through the sets of asymmetrical devices to provide a unipolar output signal in the output circuit,
the energy storage means for both switch conditions being connected to the signal amplifying means to provide the necessary bias current for the signal amplifying means.

References Cited by the Examiner

UNITED STATES PATENTS

| | | | |
|---|---|---|---|
| 2,775,714 | 12/1956 | Curtis | 307—88.5 |
| 2,840,726 | 6/1958 | Hamilton | 307—88.5 |
| 2,874,284 | 2/1959 | Conger | 328—208 XR |
| 2,990,477 | 6/1961 | MacIntyre | 328—208 XR |
| 3,058,008 | 10/1962 | Clapper | 307—88.5 |
| 3,060,322 | 10/1962 | Erickson et al. | 307—88.5 |

OTHER REFERENCES

Publication: "A One-Zero and Blank Detector," by E. F. Yhap, in Tech. Disclosure Bulletin, vol. 3, No. 10, March 1961, p. 83.

ARTHUR GAUSS, *Primary Examiner.*

JOHN W. HUCKERT, *Examiner.*